(12) United States Patent
Seo et al.

(10) Patent No.: US 8,581,551 B2
(45) Date of Patent: Nov. 12, 2013

(54) POWER STORAGE APPARATUS

(75) Inventors: Kyung-Won Seo, Yongin-si (KR);
Eun-Ok Kwak, Yongin-si (KR)

(73) Assignee: Samsung SDI Co., Ltd., Yongin-si, Gyeonggi-do (KR)

(*) Notice: Subject to any disclaimer, the term of this patent is extended or adjusted under 35 U.S.C. 154(b) by 390 days.

(21) Appl. No.: 13/064,780

(22) Filed: Apr. 14, 2011

(65) Prior Publication Data

US 2012/0091965 A1 Apr. 19, 2012

(30) Foreign Application Priority Data

Oct. 13, 2010 (KR) ........................ 10-2010-0099931

(51) Int. Cl.
*H02J 7/00* (2006.01)

(52) U.S. Cl.
USPC ............................ 320/128; 320/101; 320/126

(58) Field of Classification Search
USPC ....................................................... 320/128
See application file for complete search history.

(56) References Cited

U.S. PATENT DOCUMENTS

| | | | | |
|---|---|---|---|---|
| 5,452,172 A | * | 9/1995 | Lane et al. ...................... | 361/71 |
| 6,307,352 B1 | * | 10/2001 | Hooper ............................ | 320/139 |
| 6,420,851 B1 | | 7/2002 | Schoofs et al. | |
| 7,425,779 B2 | * | 9/2008 | Luo et al. ........................ | 307/82 |
| 7,735,198 B2 | | 6/2010 | Petermann et al. | |
| 8,159,184 B2 | * | 4/2012 | Emori et al. ................... | 320/116 |
| 2008/0258683 A1 | * | 10/2008 | Chang ............................ | 320/112 |
| 2010/0225275 A1 | | 9/2010 | Bucur et al. | |
| 2012/0091963 A1 | * | 4/2012 | Vance et al. ................... | 320/118 |

FOREIGN PATENT DOCUMENTS

| | | |
|---|---|---|
| JP | 2004-506870 A | 3/2004 |
| JP | 2007-122882 A | 5/2007 |
| KR | 10-2006-0109048 | 10/2006 |
| KR | 10-2007-0101496 A | 10/2007 |
| KR | 10-2010-0029058 | 3/2010 |
| WO | WO 00/62086 A1 | 10/2000 |

OTHER PUBLICATIONS

Korean Office Action in KR 10-2010-0099931, dated Nov. 8, 2011 (Seo, et al.).

* cited by examiner

*Primary Examiner* — Arun Williams
(74) *Attorney, Agent, or Firm* — Lee & Morse, P.C.

(57) ABSTRACT

A power storage apparatus includes a main power line, a first battery rack connected to an output terminal of the main power line at a first distance from the output terminal, a second battery rack connected to an output terminal of the main power line at a second distance from the output terminal, the second distance being different from the first distance, and a load resistor connected between the second battery rack and the main power line, the load resistor having a resistance that adjusts an impedance difference between the first battery rack and the second battery rack, the impedance difference resulting from a difference between the first distance and the second distance.

16 Claims, 2 Drawing Sheets

POWER STORAGE APPARATUS

BACKGROUND

1. Field

Embodiments relate to a power storage apparatus.

2. Description of the Related Art

Recently, the European Union has decided upon a plan to expand the percentage of renewable energy, from among all electric power sources, up to 20% by the year 2020 and 50% by the year 2050. The U.S.A. is also planning to carry out Renewable Portfolio Standards (RPS). In a situation where renewable energy increases from less than 5% today to up to 30 to 40% in the future, of all the electric power sources, power systems must be prepared for a new change.

The above information disclosed in this Background section is only for enhancement of understanding of the background of the invention and therefore it may contain information that does not form the prior art that is already known in this country to a person of skill in the art.

SUMMARY

An embodiment is directed to a power storage apparatus, including a main power line, a first battery rack connected to an output terminal of the main power line at a first distance from the output terminal, a second battery rack connected to an output terminal of the main power line at a second distance from the output terminal, the second distance being different from the first distance, and a load resistor connected between the second battery rack and the main power line, the load resistor having a resistance that adjusts an impedance difference between the first battery rack and the second battery rack, the impedance difference resulting from a difference between the first distance and the second distance.

The first battery rack and the second battery rack may be coupled to the main power line in parallel.

Each output terminal of the main power line may be respectively connected to a power converting apparatus converting charge and discharge power of the first battery rack and the second battery rack.

The load resistor may be connected between a first electrode terminal of the second battery rack and the main power line, and may be a charge path load resistor acting as a load under charge.

The load resistor may be connected between a second electrode terminal of the second battery rack and the main power line, and may be a discharge path load resistor acting as a load under discharge.

The main power line may be made of a copper material having a predetermined resistance.

The power storage apparatus may further include a first rack battery management system managing the first battery rack, a second rack battery management system managing the second battery rack, and a system battery management system managing the first rack battery management system and the second rack battery management system.

The load resistor may have a resistance that substantially eliminates the impedance difference.

The second distance may be less than the first distance.

A resistance of the main power line over the second distance may be less than a resistance of the main power line over the first distance, and the load resistor may offset the lesser resistance of the main power line over the second distance so as to reduce the impedance difference.

Another embodiment is directed to a power storage apparatus, including a plurality of battery racks, a main power line connected to a converting apparatus, the converting apparatus converting a charge and discharge power of the plurality of battery racks, and sub-power lines parallel-coupling the battery racks to nodes of the main power line, at least some of the sub-power lines having a load resistor that compensates a resistance increase of the main power line as a distance from the power converting apparatus to the respective node increases.

Respective load resistors of the sub-power lines may each have an increasingly larger resistance as the distance from the power converting apparatus to the respective nodes decreases.

The load resistor may be a charge path load resistor acting as a load under charge of the respective battery rack.

The load resistor may be a discharge path load resistor acting as a load under discharge of the respective battery rack.

A thickness or a width of the plurality of sub-power lines may become less as the distance from the power converting apparatus to the nodes connected to the plurality of battery racks is gradually decreased to compensate the resistance of the plurality of sub-power lines.

The main power line may be made of a copper material having a predetermined resistance.

BRIEF DESCRIPTION OF THE DRAWINGS

The above and other features and advantages will become more apparent to those of skill in the art by describing in detail example embodiments with reference to the attached drawings, in which.

DETAILED DESCRIPTION

Figure 1:
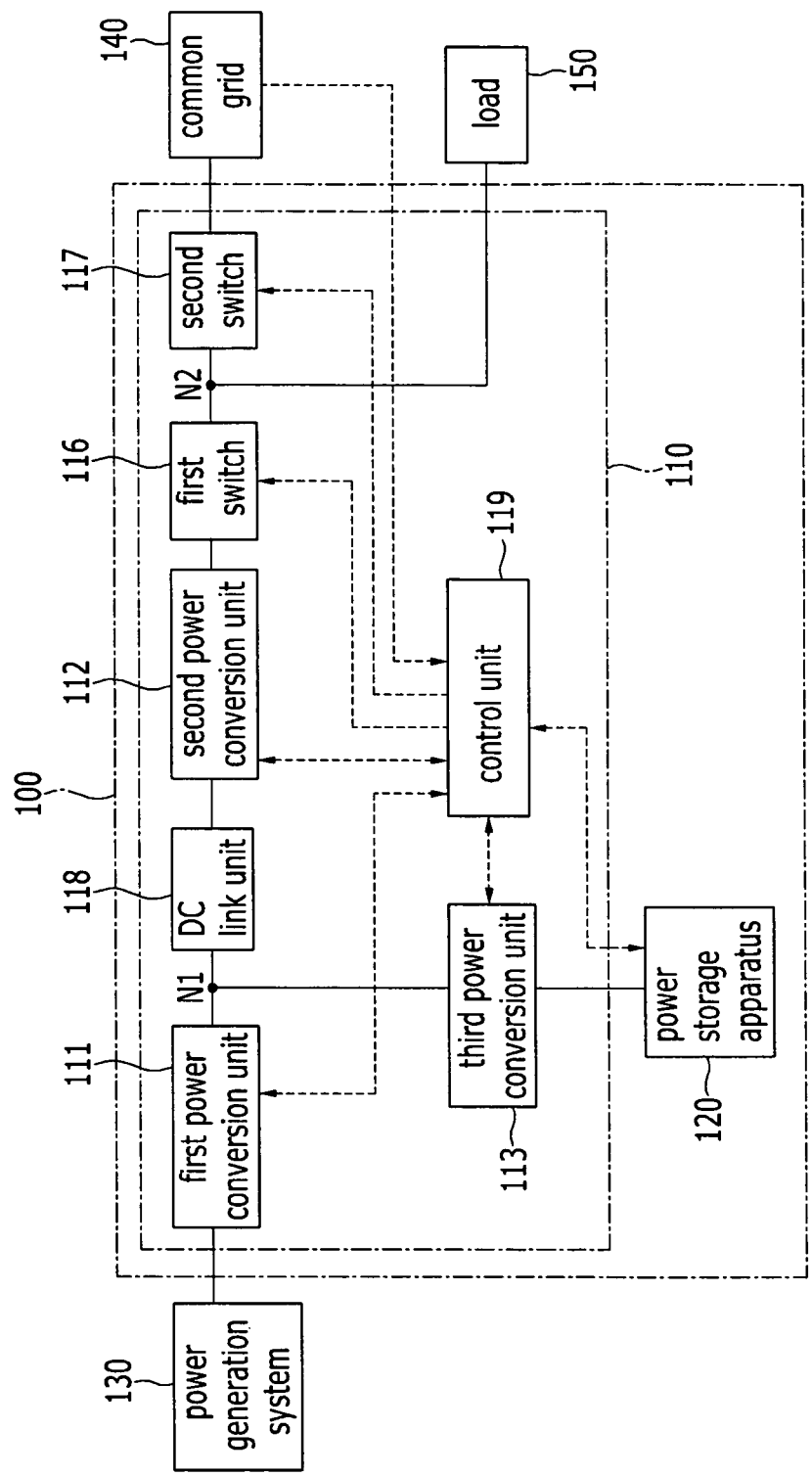
FIG. 1 illustrates a block diagram of a grid-tied power storage system according to an example embodiment.

Korean Patent Application No. 10-2010-0099931, filed on Oct. 13, 2010, in the Korean Intellectual Property Office, and entitled: "Power Storage Apparatus," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

The described embodiments may be modified in various different ways without departing from the spirit or scope of the invention. In some example embodiments, constituent elements having the same construction are assigned the same reference numerals and may be described in connection with a first example embodiment as a representative example. In the remaining example embodiments, only constituent elements different from those of the first example embodiment may be described. In order to clarify a description of the embodiments, parts not related to the description may be omitted. The same reference numbers are used throughout the drawings to refer to the same or like parts.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

Embodiments relate to a power storage apparatus configured to uniformly share a load to a plurality of battery racks.

FIG. 1 illustrates a block diagram showing a grid-tied power storage system 100 according to an example embodiment.

Referring to FIG. 1, the grid-tied power storage system 100 may include a power management system 110 and a power storage apparatus 120.

The grid-tied power storage system 100 may be connected to a power generation system 130, a common grid 140, and a load 150.

The power generation system 130 may include a system for producing electrical energy by using renewable energy, such as solar power, wind power, wave power, tidal power, and geothermal power. For example, a solar power generation system may include a solar cell module in which a plurality of solar cells (for converting solar lighting into electrical energy) are coupled in series or in parallel. The energy produced by the power generation system 130 may be variable, e.g., as solar power varies with the time of day, weather conditions, etc.

The common grid 140 may include a power station for producing electric power by using, e.g., heating power or fossil fuels, water power, or atomic power generation, and a substation or a power transmission site for changing the properties of a voltage or current in order to transmit the produced power through a transmission line or a distribution line.

The load 150 may include one or more of various electrically driven devices that consume power. For example, the load may include household appliances, consumer electronics, production facilities at factories, etc.

The power management system 110 may be a system for associating power grids, such as power of the power generation system 130, power of the common grid 140, and power of the power storage apparatus 120. The power management system 110 may, among other things, manage a temporal mismatch between production and consumption of a power grid using the power storage apparatus 120.

The power storage apparatus 120 may include one or more storage devices, e.g., a rechargeable battery that can be repeatedly charged and discharged. Examples of the rechargeable battery may include a nickel-cadmium battery, a lead-acid battery, a nickel-hydrogen battery, a lithium-ion battery, a lithium polymer battery, and so on. The power storage apparatus 120 may include a plurality of battery packs in which a plurality of rechargeable batteries are connected in parallel or in series. The power storage apparatus 120 may include a plurality of battery racks in which a plurality of battery packs are coupled in series, and the battery racks may be coupled in parallel. The power storage apparatus 120 may use one or more load resistors to uniformly share the load to a plurality of battery racks that are coupled in parallel, so as to reduce an impedance difference of a path of wires connected to a plurality of battery racks.

A battery management system ("BMS"), for controlling the charge and discharge of a battery, may be included in the power storage apparatus 120 or the power management system 110. The battery management system may function to protect the battery from overcharge, over-discharge, overcurrent, and/or overheating by detecting a voltage, current, or temperature of the battery and monitoring a state of charge ("SOC") and state of health ("SOH") of the battery or batteries, and may function to improve the efficiency of the battery through cell balancing.

The power management system 110 may include a first power conversion unit 111, a second power conversion unit 112, a third power conversion unit 113, a first switch 116, a second switch 117, a DC link unit 118, and a control unit 119.

The first power conversion unit III may be connected to the power generation system 130 and may be configured to convert a first power, generated by the power generation system 130, into a second power and transfer the second power to a first node N1. The first power generated by the power generation system 130 may be DC power or AC power, and the first power conversion unit 111 may convert the generated power such that the second power of the first node N1 is DC power. Thus, the first power conversion unit 111 may play the role of a converter for converting the first power of DC into the second power having another magnitude and/or an inverter for converting the first power of AC power into the second power of DC.

The first power conversion unit 111 may perform maximum power point tracking ("MPPT") control for maximizing power generated by the power generation system 130. Thus, the first power conversion unit 111 may be an MPPT converter having a maximum power point tracking function.

The DC link unit 118 may be connected to the first node N1 and may be configured to maintain a voltage level of the first node N1 at a DC link voltage level. The DC link unit 118 may prevent a voltage level of the first node N1 from becoming unstable because of a shift in the output voltage of the power generation system 130, an instant voltage drop of the common grid 140, or the generation of a maximum load of the load 150. Consequently, the second power conversion unit 112 and the third power conversion unit 113 may be normally operated.

The DC link unit 118 may include, or may be, a capacitor for a DC link connected in parallel between the first node N1 and the second power conversion unit 112. An aluminum electrolytic capacitor, a polymer capacitor, or a multi-layer ceramic capacitor may be used as the capacitor for the DC link.

The second power conversion unit 112 may be connected between the first node N1 and the second node N2. The common grid 140 and the load 150 may be connected to the second node N2. The second power conversion unit 112 may convert DC power of the first node N1 into AC power and transfer the AC power to the second node N2. Furthermore, the second power conversion unit 112 may convert AC power of the second node N2 into DC power and transfer the DC power to the first node N1. Thus, the second power conversion unit 112 may act as a bi-directional inverter for converting the DC power of the first node N1 and the AC power of the second node N2 in both directions. AC power, to be supplied to the common grid 140 and the load 150, or AC power supplied from the common grid 140, may be provided to the second node N2.

The third power conversion unit 113 may be connected between the first node N1 and the power storage apparatus 120. The third power conversion unit 113 may convert the second power of DC, supplied from the first node N1, into a third power of DC, to be stored in the power storage apparatus 120. Further, the third power conversion unit 113 may transfer the third power of DC to the power storage apparatus 120. Furthermore, the third power conversion unit 113 may convert the third power of DC, supplied from the power storage apparatus 120, into the second power of DC, and transfer the second power of DC to the first node N1. Thus, the third power conversion unit 113 may act as a bi-directional converter for converting the DC power of the first node N1 and the DC power of the power storage apparatus 120 in both directions.

The first switch 116 may be connected between the second power conversion unit 112 and the second node N2, and may be configured to cut off the flow of power between the second power conversion unit 112 and the second node N2. The second switch 117 may be connected between the second node N2 and the common grid 140, and may be configured to cut off the flow of power between the second node N2 and the common grid 140. A field effect transistor (FET), a bipolar junction transistor (BJT), or the like may be included in, or used as, the first switch 116 and the second switch 117 respectively.

When an abnormality is generated in the common grid 140, the second switch 117 may cut off the supply of power to the common grid 140 and implement an independent operation of the grid-tied power storage system 100. When the second switch 117 is opened, the grid-tied power storage system 100 may be separated from the common grid 140, and may thus be independently operated by power of the power generation system 130 and the power storage apparatus 120. Accordingly, the common grid 140 may be prevented from being operated in an abnormal state by power output from the grid-tied power storage system 100.

The control unit 119 may control the general operation of the power management system 110. The control unit 119 may receive information (e.g., sensing signals related to voltage, current, and temperature) about power, generated by the power generation system 130, from the first power conversion unit 111. The control unit 119 may receive power storage information, including an SOC, an SOH, etc., from the power storage apparatus 120 (or a BMS). The control unit 119 may receive grid information, including a voltage, current, temperature, etc. of a grid, from the common grid 140. The control unit 119 may control an operating mode of the power management system 110 on the basis of the information about power generated by the power generation system 130, the power storage information of the power storage apparatus 120, and the grid information of the common grid 140.

Furthermore, the control unit 119 may receive sensing signals related to voltage, current, and temperature from the first power conversion unit 111, the second power conversion unit 112, and the third power conversion unit 113, and may control the power conversion efficiency of each of the power conversion units 111, 112, and 113 according to an operating mode of the power management system 110. The control unit 119 may control the on and off states of the first switch 116 and the second switch 117 according to an operating mode of the power management system 110.

The operating modes of the power management system 110 may be classified according to a power supply method between two or more of the power storage apparatus 120, the power generation system 130, the common grid 140, and the load 150. For example, the operating modes of the power management system 110 may include (1) the supply of power from the power generation system 130 to the power storage apparatus 120, (2) the supply of power from the power generation system 130 to the common grid 140, (3) the supply of power from the power generation system 130 to the load 150, (4) the supply of power from the power storage apparatus 120 to the common grid 140, (5) the supply of power from the power storage apparatus 120 to the load 150, (6) the supply of power from the common grid 140 to the power storage apparatus 120, and (7) the supply of power from the common grid 140 to the load 150.

(1) When power is supplied from the power generation system 130 to the power storage apparatus 120, the control unit 119 may transmit an off signal to the first switch 116, thereby cutting off the flow of the power from the first node N1 to the second node N2. The first power generated by the power generation system 130 may be converted into the second power of DC by the first power conversion unit 111. Voltage of the second power may be stabilized at a DC link voltage level by the DC link unit 118. The second power, stabilized at the DC link voltage level, may be converted into the third power of DC by the third power conversion unit 113 and then supplied to the power storage apparatus 120, thereby charging one or more batteries. Under the battery charge, a plurality of battery racks may be uniformly charged using a charge path load resistor controlling an impedance difference of the wire path connected to the plurality of battery racks.

(2) When power is supplied from the power generation system 130 to the common grid 140, the control unit 119 may transmit an off signal to the third power conversion unit 113, thereby cutting off the flow of the power from the first node N1 to the power storage apparatus 120. The control unit 119 may transmit an on signal to the first switch 116 and the second switch 117. The first power generated by the power generation system 130 may be converted into the second power of DC by the first power conversion unit 111. Voltage of the second power may be stabilized at a DC link voltage level by the DC link unit 118. The second power, stabilized at the DC link voltage level, may be converted into AC power by the second power conversion unit 112 and then supplied to the common grid 140. Here, the second power conversion unit 112 may output AC power that conforms to power quality criteria, such as the total harmonic distortion (THD), power factor, etc., of voltage and current for the common grid 140.

(3) When power is supplied from the power generation system 130 to the load 150, the control unit 119 may transmit an off signal to the third power conversion unit 113 and the second switch 117, thereby cutting off the flow of the power from the first node N1 to the power storage apparatus 120 and the common grid 140. The control unit 119 may transmit an on signal to the first switch 116. The first power generated by the power generation system 130 may be converted into the second power of DC by the first power conversion unit 111. Voltage of the second power may be stabilized at a DC link voltage level by the DC link unit 118. The second power, stabilized at the DC link voltage level of the first node N1, may be converted into AC power by the second power conversion unit 112 and then supplied to the load 150. The load 150 may be adapted for use of AC power of the common grid 140, and, thus, the second power conversion unit 112 may output AC power that is used in the load 150 and conforms to power quality criteria for the common grid 140.

(4) When power is supplied from the power storage apparatus 120 to the common grid 140, the control unit 119 may transmit an on signal to the first switch 116 and the second switch 117. DC power of an output voltage level, output by the power storage apparatus 120, may be converted into DC power of a DC link voltage level by the third power conversion unit 113 and then stabilized by the DC link unit 118. The power, stabilized at the DC link voltage level of the first node N1, may be converted into AC power by the second power conversion unit 112 and then supplied to the common grid 140. Under the battery discharge, a plurality of battery racks may be uniformly discharged using the discharge path load resistor controlling the impedance difference by the wire path connected to a plurality of battery rack.

(5) When power is supplied from the power storage apparatus 120 to the load 150, the control unit 119 may transmit an on signal to the first switch 116 and transmit an off signal to the second switch 117. DC power of an output voltage level, output by the power storage apparatus 120, may be converted into DC power of a DC link voltage level by the third power conversion unit 113 and then stabilized by the DC link unit 118. The power, stabilized at the DC link voltage level of the first node N1, may be converted into AC power by the second power conversion unit 112 and then supplied to the load 150. Under the battery discharge, a plurality of battery racks may be uniformly discharged using the discharge path load resistor controlling the impedance difference by the wire path connected to a plurality of battery racks.

(6) When power is supplied from the common grid 140 to the power storage apparatus 120, the control unit 119 may transmit an on signal to the first switch 116 and the second switch 117. AC power of the common grid 140 may be converted into DC power of a DC link voltage level by the second power conversion unit 112. The DC power of a DC link voltage level of the first node N1 may be converted into DC power of a voltage level for storing power by the third power conversion unit 113 and then supplied to the power storage apparatus 120. Under the battery charge, a plurality of battery racks may be uniformly charged using the discharge path load resistor controlling the impedance difference by the wire path connected to a plurality of battery racks.

(7) When power is supplied from the common grid 140 to the load 150, the control unit 119 may transmit an off signal to the first switch 116 and an on signal to the second switch 117. AC power of the common grid 140 may be supplied to the load 150.

The operating mode of the power management system 110 is described above using classifications according to a power supply method among the power storage system 120, the power generation system 130, the common grid 140, and the load 150. However, the power supply methods may be performed in combination. The operating mode of the power management system 110 may be configured in various ways. For example, power may be supplied from the power generation system 130 to the power storage apparatus 120 and the load 150, or power may be supplied from the power generation system 130 and the power storage apparatus 120 to the load 150. In some embodiments, power may be supplied from the power generation system 130 and the power storage apparatus 120 to the common grid 140 and the load 150.

Figure 2:
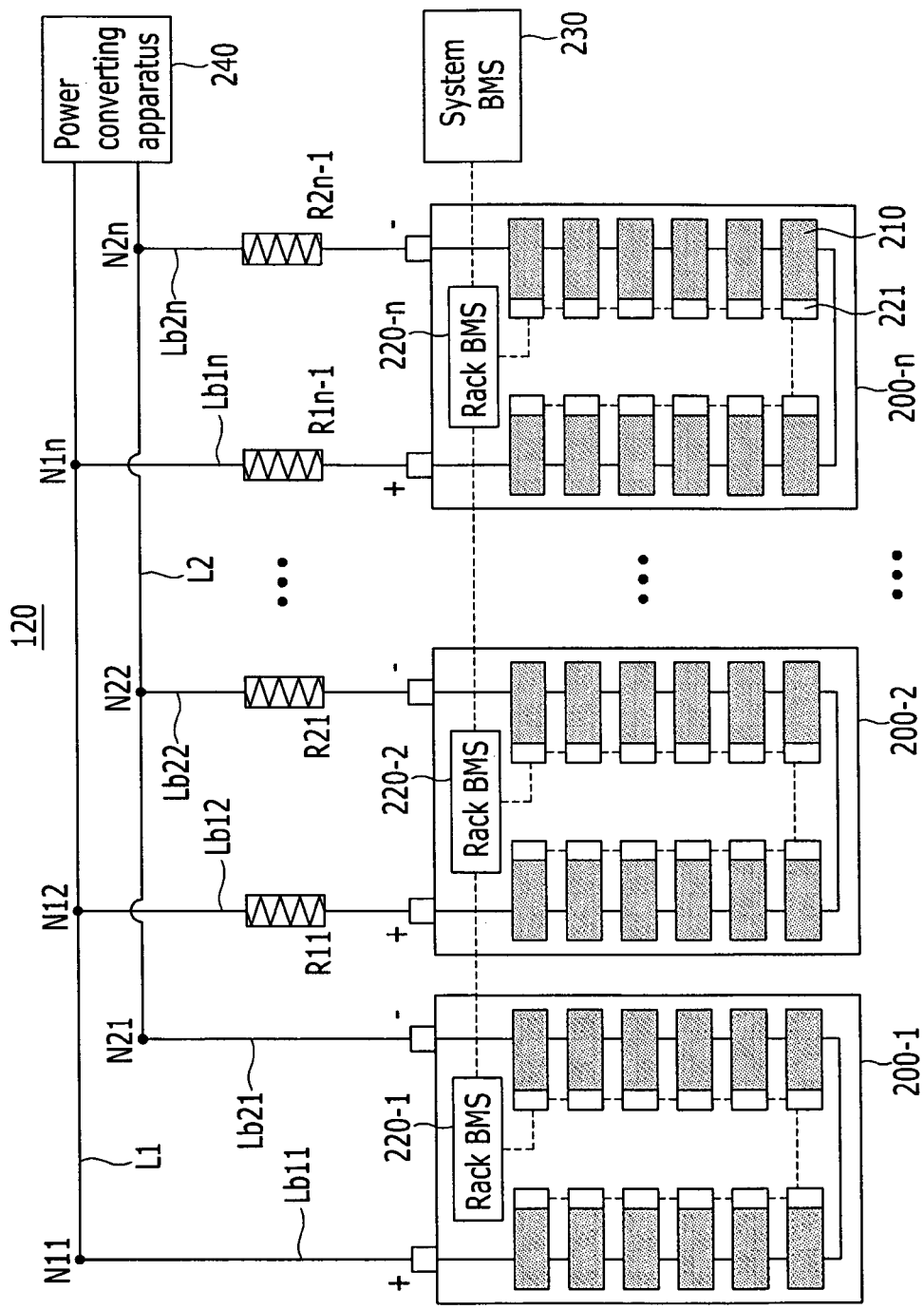
FIG. 2 illustrates a block diagram of a power storage apparatus according to an example embodiment.

FIG. 2 illustrates a block diagram of a power storage apparatus according to an example embodiment.

Referring to FIG. 2, the power storage apparatus may include a plurality of battery racks, a bus-bar, and one or more load resistors.

Battery racks 200-1, 200-2, ..., 200-$n$ may respectively include a plurality of battery packs 210 coupled in series, a plurality of pack battery management systems 221 managing the charge and discharge of the battery packs 210, and rack battery management systems 220-1, 220-2, ..., 220-$n$ managing the charge and the discharge of the corresponding battery rack.

The battery packs 210 may respectively include a plurality of cells coupled in series and/or in parallel. The battery packs 210 coupled in series may be connected to the first electrode terminal (+) and the second electrode terminal (−) of each battery rack 200-1, 200-2, ..., 200-$n$ to output a high voltage and/or a high current.

The pack battery management systems 221 may measure the voltage, the current, and the temperature of each cell included in the battery pack 210, and may transmit them to the rack battery management system of the corresponding battery rack.

The rack battery management systems 220-1, 220-2, ..., 220-$n$ may respectively transmit the measured information, such as the charge and discharge information or the voltage, the current, or the temperature, of each battery rack to a system battery management system 230. The system battery management system 230 may manage a plurality of rack battery management systems 220-1, 220-2, ..., 220-$n$. Thus, the system battery management system 230 may manage the charge and discharge of the whole battery. A CAN (controller area network) communication (denoted by a dotted line) may be connected between a plurality of pack battery management systems 221, a plurality of rack battery management systems 220-1, 220-2, ..., 220-$n$, and the system battery management system 230.

The bus-bar may include main power lines L1 and L2 connected to a power converting apparatus 240 and a plurality of sub-power lines Lb11, Lb21, Lb12, Lb22, ..., Lb1$n$, Lb2$n$ coupling the battery racks 200-1, 200-2, ..., 200-$n$ to the main power lines L1 and L2 in parallel.

A terminal of the main power lines L1 and L2 may be connected to the power converting apparatus 240; this is referred to as the output terminal of the main power lines L1 and L2.

Among the plurality of sub-power lines Lb11, Lb21, Lb12, Lb22, ..., Lb1$n$, Lb2$n$, one terminal of the first sub-power lines Lb11, Lb12, Lb1$n$ may be respectively connected to the first electrode terminal (+) of the battery racks 200-1, 200-2, ..., 200-$n$, and the other terminal of the first sub-power lines Lb11, Lb12, ..., Lb1$n$ may be respectively connected to the first main power line L1. Also, among the plurality of sub-power lines Lb11, Lb21, Lb12, Lb22, ..., Lb1$n$, Lb2$n$, one terminal of the second sub-power lines Lb21, Lb22, Lb2$n$ may be respectively connected to the second electrode terminal (−) of the battery rack 200-1, 200-2, ..., 200-$n$, and the other terminal may be respectively connected to the second main power line L2. Thus, a plurality of battery racks 200-1, 200-2, ..., 200-$n$ may be coupled in parallel to the main power lines L1 and L2.

The bus-bar may be connected to the power converting apparatus 240 and a plurality of battery racks 200-1, 200-2, ..., 200-$n$ to transmit a large current. The bus-bar may be made of a material such as copper (Cu), aluminum (Al), silver (Ag), or zinc (Zn). Particularly, the bus-bar may be made of the material having a predetermined resistance such as copper (Cu).

The power converting apparatus 240 may convert DC power discharged from the battery racks 200-1, 200-2, ..., 200-$n$ into DC power of a different level or into AC power. Also, the power converting apparatus 240 may convert DC power or AC power, transmitted from the outside, into DC power to charge the battery racks 200-1, 200-2, ..., 200-$n$.

In an implementation, the power converting apparatus 240 may perform the function of the third power conversion unit 113 of FIG. 1. In another implementation, the power converting apparatus 240 may perform the function of the third power conversion unit 113 and the second power conversion unit 112 of FIG. 1.

One or more load resistors may be connected between respective battery racks 200-1, 200-2, ..., 200-n and the main power lines L1 and L2. Each load resistor may be selected to control for a difference of impedance for each of the battery racks 200-1, 200-2, ..., 200-n, e.g., with respect to a distance from the power converting apparatus 240 to the node connected to the respective one of the battery racks 200-1, 200-2, ..., 200-n. The load resistor may compensate the increased resistance of the main power lines L1 and L2 far from the power converting, i.e., the distance from the apparatus 240 to the node connected to the respective one of the plurality of battery racks 200-1, 200-2, ..., 200-n.

For example, the first electrode terminal (+) of the first battery rack 200-1 positioned farthest from the power converting apparatus 240 may be connected to the node N11 of the first main power line L1 by the first sub-power line Lb11, and the second electrode terminal (−) is connected to the node N21 of the second main power line L2 by the second sub-power line Lb21. A load resistor may not be used on these sub-power lines.

The first electrode terminal (+) of the second battery rack 200-2 (positioned closer to the power converting apparatus 240 than the first battery rack 200-1) may be connected to node N12 of the first main power line L1 by the first sub-power line Lb12, and the second electrode terminal (−) may be connected to the node N22 of the second main power line L2 by the second sub-power line Lb22. When the distance from the power converting apparatus 240 to the node N11 or the node N21 is referred to as the first distance, and the distance from the power converting apparatus 240 to the node N12 or the node N22 is referred to as the second distance, the difference of the impedance of the main power lines L1 and L2 may be generated between the first battery rack 200-1 and the second battery rack 200-2 according to the difference between the first distance and the second distance. Thus, as compared with the second battery rack 200-2, the first battery rack 200-1 may be affected by the increased resistance of the length of the first main power line L1 between the node N11 and the node N12, or the length of the second main power line L2 between the node N21 and the node N22.

The difference of the impedance of the main power lines L1 and L2 may be further largely generated by the n-th battery rack 200-n positioned closest to the power converting apparatus 240 and the first battery rack 200-1. For example, an overload phenomenon may be generated, in which the discharge power and the charge power largely affect the battery rack positioned close to the power converting apparatus 240 according to the difference of the impedance. The cells included in the battery rack may be easily deteriorated by the overload phenomenon, compared with the other, father, battery racks.

To reduce or eliminate the overload phenomenon, a set of the plurality of sub-power lines Lb12, Lb22, ..., Lb1n, Lb2n (e.g., a set of sub-power lines that does not include the sub-power line Lb11 and Lb21 connected to the first battery rack 200-1 that is farthest positioned) may have the load resistors R11, R21, ..., R1n−1, R2n−1 respectively connected thereto. As the distance from the power converting apparatus 240 to the node connected to a plurality of battery racks 200-1, 200-2, ..., 200-n is decreased, the load resistors may have an increased resistance.

For example, the load resistor R11 (connected to the sub-power line Lb12 connected to the first electrode terminal (+) of the second battery rack 220-2) may have a resistance corresponding to the resistance of the first main power line L1 between the node N11 and the node N12. In an implementation, the resistance of the load resistor R11 may be equal to a resistance of the section of the first main power line L1 that extends from the node N11 to the node N12.

The load resistor R21 connected to the sub-power line Lb22 (connected to the second electrode terminal (−) of the second battery rack 220-2) may have a resistance corresponding to the resistance of the second main power line L2 between the node N21 and the node N22. In an implementation, the resistance of the load resistor R21 may be equal to a resistance of the section of main power line L2 that extends from the node N21 to the node N22.

The load resistor R1n−1 connected to the sub-power line Lb1n (connected to the first electrode terminal (+) of the n-th battery rack 220-n) may have a resistance corresponding to the resistance of the first main power line L1 between the node N11 and the node N1n. In an implementation, the resistance of the load resistor R1n−1 may be equal to a resistance of the section of main power line L1 that extends from the node N11 to the node N1n. The resistance of the section of main power line L1 that extends from the node N11 to the node N1n may be greater than the resistance of the section of the first main power line L1 that extends from the node N11 to the node N12. Thus, the resistance of the resistor R1n−1 may be greater than the resistance of the resistor R11.

Similarly, the load resistor R2n−1 connected to the sub-power line Lb2n connected to the second electrode terminal (−) of the n-th battery rack 220-n may have a resistance corresponding to the resistance of the second main power line L2 between the node N21 and the node N2n. The resistance of the load resistor R2n−1 may thus be greater than the resistance of the more distant load resistor R21.

The first load resistors R11, ..., R1n−1 connected to the first sub-power lines Lb12, ..., Lb1n (connected to the first electrode terminals (+) of the battery racks 200-1, 200-2, ..., 200-n) may be discharge path load resistors acting as the load under the discharge of the plurality of battery racks 200-1, 200-2, ..., 200-n. The second load resistors R21, ..., R2n−1 (connected to the second sub-power lines Lb22, Lb2n connected to the second electrode terminals (−) of the battery racks 200-1, 200-2, ..., 200-n) may be charge path load resistors acting as the load under the charge of the plurality of battery racks 200-1, 200-2, ..., 200-n.

The load resistors may compensate the resistance increased by the main power lines L1 and L2 as the battery racks are farther away from the power converting apparatus 240 connected to a plurality of sub-power lines Lb12, Lb22, Lb1n, Lb2n. In an implementation, the resistance of a plurality of load resistors R11, R21, ..., R1n−1, R2n−1 may be selected by measuring the impedance value between the plurality of battery racks 200-1, 200-2, ..., 200-n.

In another embodiment, the sub-power lines Lb12, Lb22, ..., Lb1n, Lb2n may be formed to have resistance corresponding to the plurality of load resistors R11, R21, ..., R1n−1, R2n−1. For example, the thickness or the width of the plurality of sub-power lines Lb12, Lb22, ..., Lb1n, Lb2n may be decreased (thereby restricting current flow) as the distance from the power converting apparatus to the node connected to the plurality of battery rack 220-1, 220-2, ..., 220-n is decreased to compensate the resistance of the main power line. This embodiment may be used instead of, or in conjunction with, the above-described load resistors.

As described above, the resistance due to the main power line may be compensated by the load resistor, such that the impedance difference between the plurality of battery racks is decreased and the overload phenomenon of the battery rack positioned close to the power converting apparatus 240 may be removed. It is not easy to control the amount of generation of renewable energy because the amount of generation of renewable energy, such as solar power, wind power, and wave power, may change according to natural conditions. It may be important to overcome degradation in power quality of a power system and a mismatch between production and consumption times, which can be generated because of such a shift in renewable energy generation. Power quality is evaluated on the basis of voltage and frequency. If the supply quantity of renewable energy does not coincide with the demand quantity of renewable energy in real time, abnormalities are generated in voltage and frequency, thereby being capable of deteriorating the power quality of all power systems.

A power storage system may be used to manage such a shift in renewable energy. The power storage system may efficiently control demand and supply by charging electricity when the amount of generation of renewable energy is high and discharging electricity when the consumption of renewable energy is high. Power storage techniques may include, e.g., pumping-up power generation, compressed air energy storage (CAES), flywheel, superconducting magnetic energy storage (SMES), rechargeable battery storage, and so on. The pumping-up power generation technique is a method of generating electricity by rotating a turbine by pumping up water in a dam when excess electricity is available and discharging water from the dam when the amount of electricity is insufficient. The CAES technique is a method of generating electricity by compressing air in the ground or sea and then discharging the air as occasion demands. The flywheel technique is a method of generating electricity by rotating a flywheel, like a spinning top, when excess electricity is available and rotating a power generator using the flywheel when the amount of electricity is insufficient. The SMES technique is a method using a principle that current is stored in a superconducting coil having resistance of 0. The rechargeable battery is a battery that can be repeatedly charged and discharged, such as that used in an uninterruptible power supply (UPS) for temporarily supplying electricity upon a power failure. The rechargeable battery may be particularly suitable as an auxiliary power source of renewable energy.

A power storage system may be used to not only store the generated power of the renewable energy in a large capacity rechargeable battery (or a plurality of rechargeable batteries are connected to each other, etc.), but also in cooperation with a common grid to store the power of the common grid to the battery. The power storage system may supply the power stored in the battery to the common grid or the generated power of the renewable energy to the common grid.

The batteries may be configured as a plurality of battery racks coupled in parallel, thereby being designed to be capable of expanding the capacity thereof. However, a difference between wire lengths from the respective battery racks to a power converting apparatus (converting charge and discharge power of the batteries) may result. Accordingly, the load may be non-uniformly provided as a result of the non-uniformity of an internal resistance of the wire for each battery rack. For example, an overload phenomenon may be generated in the battery rack positioned near the power converting apparatus such that deterioration of the cell including that battery rack may be generated.

As described above, according to embodiments, load resistors may be used to balance impedances such that the load may be uniformly shared to a plurality of battery racks. Thus, it may be possible to reduce or eliminate overloads generated in the battery rack positioned close to the power converting apparatus according to the non-uniformity of the current and the internal resistance. Further, the deterioration of the cells may be prevented and the life-span may be increased.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A power storage apparatus, comprising:
    a main power line;
    a first battery rack connected to an output terminal of the main power line at a first distance from the output terminal;
    a second battery rack connected to an output terminal of the main power line at a second distance from the output terminal, the second distance being different from the first distance; and
    a load resistor connected between the second battery rack and the main power line, the load resistor having a resistance that adjusts an impedance difference between the first battery rack and the second battery rack, the impedance difference resulting from a difference between the first distance and the second distance.

2. The power storage apparatus as claimed in claim 1, wherein the first battery rack and the second battery rack are coupled to the main power line in parallel.

3. The power storage apparatus as claimed in claim 1, wherein each output terminal of the main power line is respectively connected to a power converting apparatus converting charge and discharge power of the first battery rack and the second battery rack.

4. The power storage apparatus as claimed in claim 1, wherein the load resistor is connected between a first electrode terminal of the second battery rack and the main power line, and is a charge path load resistor acting as a load under charge.

5. The power storage apparatus as claimed in claim 1, wherein the load resistor is connected between a second electrode terminal of the second battery rack and the main power line, and is a discharge path load resistor acting as a load under discharge.

6. The power storage apparatus as claimed in claim 1, wherein the main power line is made of a copper material having a predetermined resistance.

7. The power storage apparatus as claimed in claim 1, further comprising:
    a first rack battery management system managing the first battery rack;
    a second rack battery management system managing the second battery rack; and
    a system battery management system managing the first rack battery management system and the second rack battery management system.

8. The power storage apparatus as claimed in claim 1, wherein the load resistor has a resistance that substantially eliminates the impedance difference.

9. The power storage apparatus as claimed in claim 8, wherein the second distance is less than the first distance.

10. The power storage apparatus as claimed in claim 1, wherein a resistance of the main power line over the second distance is less than a resistance of the main power line over the first distance, and the load resistor offsets the lesser resistance of the main power line over the second distance so as to reduce the impedance difference.

11. A power storage apparatus, comprising:
a plurality of battery racks;
a main power line connected to a converting apparatus, the converting apparatus converting a charge and discharge power of the plurality of battery racks; and
sub-power lines parallel-coupling the battery racks to nodes of the main power line, at least some of the sub-power lines having a load resistor that compensates a resistance increase of the main power line as a distance from the power converting apparatus to the respective node increases.

12. The power storage apparatus as claimed in claim 11, wherein respective load resistors of the sub-power lines each have an increasingly larger resistance as the distance from the power converting apparatus to the respective nodes decreases.

13. The power storage apparatus as claimed in claim 11, wherein the load resistor is a charge path load resistor acting as a load under charge of the respective battery rack.

14. The power storage apparatus as claimed in claim 11, wherein the load resistor is a discharge path load resistor acting as a load under discharge of the respective battery rack.

15. The power storage apparatus as claimed in claim 11, wherein a thickness or a width of the plurality of sub-power lines becomes less as the distance from the power converting apparatus to the nodes connected to the plurality of battery racks is gradually decreased to compensate the resistance of the plurality of sub-power lines.

16. The power storage apparatus as claimed in claim 11, wherein the main power line is made of a copper material having a predetermined resistance.

* * * * *